United States Patent
Cui et al.

(10) Patent No.: US 12,522,984 B2
(45) Date of Patent: Jan. 13, 2026

(54) METHOD OF PAVING A ROADWAY USING HYDROGEL MODIFIED SUBGRADE

(71) Applicants: SHANDONG JIAOTONG UNIVERSITY, Shandong (CN); SHANDONG UNIVERSITY, Shandong (CN); CHONGQING UNIVERSITY, Chongqing (CN); JINAN JINYUE HIGHWAY ENGINEERING CO., LTD., Shandong (CN)

(72) Inventors: Xinzhuang Cui, Jinan (CN); Jin Li, Jinan (CN); Qing Jin, Jinan (CN); Shen Zuo, Jinan (CN); Dalu Xiong, Jinan (CN); Peng Jiang, Jinan (CN); Xiaoning Zhang, Jinan (CN); Yefeng Du, Jinan (CN); Kai Yuan, Jinan (CN); Chongsheng Xin, Jinan (CN)

(73) Assignees: SHANDONG JIAOTONG UNIVERSITY, Jinan (CN); SHANDONG UNIVERSITY, Jinan (CN); CHONGQING UNIVERSITY, Chongqing (CN); JINAN JINYUE HIGHWAY ENGINEERING CO., LTD., Jinan (CN)

( * ) Notice: Subject to any disclaimer, the term of this patent is extended or adjusted under 35 U.S.C. 154(b) by 231 days.

(21) Appl. No.: 18/284,418

(22) PCT Filed: Oct. 31, 2022

(86) PCT No.: PCT/CN2022/128731
§ 371 (c)(1),
(2) Date: Sep. 27, 2023

(87) PCT Pub. No.: WO2023/093468
PCT Pub. Date: Jun. 1, 2023

(65) Prior Publication Data
US 2024/0158994 A1    May 16, 2024

(30) Foreign Application Priority Data
Nov. 26, 2021 (CN) .......................... 202111422960.3

(51) Int. Cl.
*E01C 3/00* (2006.01)
*C08F 220/28* (2006.01)
(Continued)

(52) U.S. Cl.
CPC ............ *E01C 3/04* (2013.01); *C08F 220/281* (2020.02); *C08K 3/22* (2013.01); *C08K 3/346* (2013.01);
(Continued)

(58) Field of Classification Search
CPC . E01C 3/003; E01C 3/04; E01C 19/00; C08K 3/22; C08K 3/346; C08K 2201/014; C08F 220/281
(Continued)

(56) References Cited

U.S. PATENT DOCUMENTS

2007/0044528 A1* 3/2007 Kitchen ................... C05G 5/23
                                                                    71/28
2011/0024514 A1* 2/2011 Breen ..................... A01G 13/35
                                                                    252/88.1
(Continued)

FOREIGN PATENT DOCUMENTS

| CA | 1 199 484 A | 1/1986 | | |
| CA | 2818929 A1 * | 11/2014 | ............. | E02B 3/108 |

(Continued)

OTHER PUBLICATIONS

Jan. 13, 2023 International Search Report issued in International Patent Application No. PCT/CN2022/128731.
(Continued)

*Primary Examiner* — Raymond W Addie

(74) *Attorney, Agent, or Firm* — Oliff PLC

(57) ABSTRACT

An adjustment method of moisture content and dense state for a hydrogel improved subgrade based on weather-resistance during an in-service period, including: step 1: carrying out surface cleaning and compaction of ground; step 2: preparing hydrogel improved subgrade raw material; step 3: paving the prepared material on the surface to form first-layer improved subgrade; and step 4: paving plain soil subgrade onto the first-layer. The method combines the water absorption and release function of the modified resin and the characteristic of the gel state thereof, to pave the improved subgrade in layers, which can absorb water and slightly expand when the water content in the subgrade is increased to a certain threshold value, and a strength and compactness protective layer can also be formed at the connection sections of the ground and the subgrade, and the subgrade and the pavement, to prevent the pot-cover effect from occurring.

9 Claims, 1 Drawing Sheet

(51) Int. Cl.
| | | |
|---|---|---|
| *C08K 3/22* | (2006.01) | |
| *C08K 3/34* | (2006.01) | |
| *E01C 3/04* | (2006.01) | |
| *E01C 19/00* | (2006.01) | |

(52) U.S. Cl.
CPC .............. *E01C 3/003* (2013.01); *E01C 19/00* (2013.01); *C08K 2201/014* (2013.01)

(58) Field of Classification Search
USPC .......................................................... 404/76
See application file for complete search history.

(56) References Cited

U.S. PATENT DOCUMENTS

| | | | |
|---|---|---|---|
| 2018/0119185 A1* | 5/2018 | Kavazanjian | ........... C01F 11/00 |
| 2019/0055699 A1* | 2/2019 | Flitsch | ................... B33Y 80/00 |
| 2019/0256770 A1* | 8/2019 | He | ............................ E02D 3/12 |

FOREIGN PATENT DOCUMENTS

| | | | | |
|---|---|---|---|---|
| CN | 1521196 | A | 8/2004 | |
| CN | 101117422 | A | 2/2008 | |
| CN | 106676991 | A | 5/2017 | |
| CN | 106902487 | A | 6/2017 | |
| CN | 108559516 | A | 9/2018 | |
| CN | 111424480 | A | 7/2020 | |
| CN | 113046086 | A | 6/2021 | |
| CN | 114032723 | A | 2/2022 | |
| JP | 2007-069457 | A | 3/2007 | |
| JP | 2007-154411 | A | 6/2007 | |
| WO | WO-2017139750 | A1 * | 8/2017 | ................ C08L 1/26 |
| WO | WO-2021006751 | A1 * | 1/2021 | ............ A01G 13/35 |

OTHER PUBLICATIONS

Jan. 13, 2023 Written Opinion of the International Searching Authority issued in International Patent Application No. PCT/CN2022/128731.

* cited by examiner

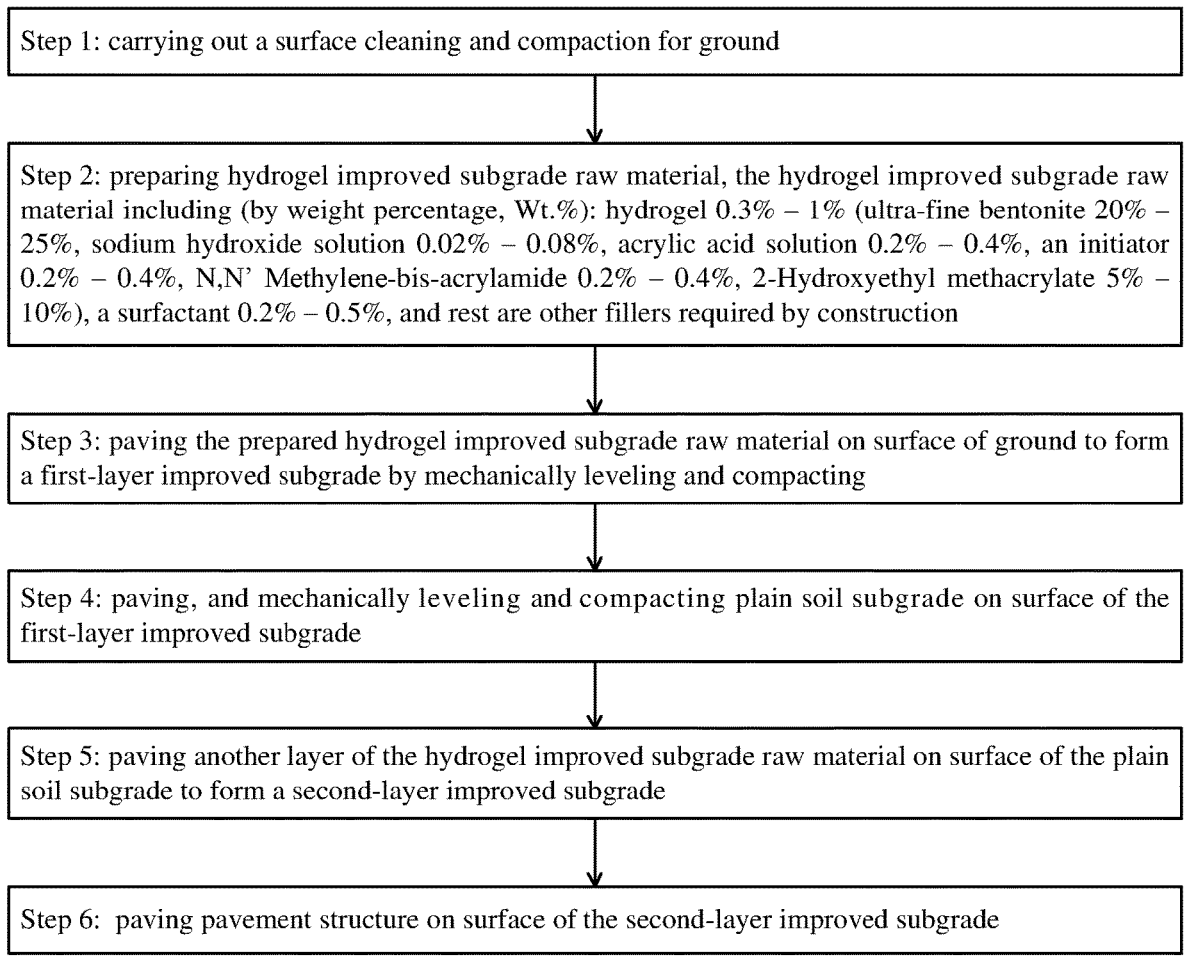

METHOD OF PAVING A ROADWAY USING HYDROGEL MODIFIED SUBGRADE

This application claims priority benefits to Chinese Patent Application No. 202111422960.3, entitled "ADJUSTMENT METHOD OF MOISTURE CONTENT AND DENSE STATE FOR HYDROGEL IMPROVED SUBGRADE BASED ON WEATHER-RESISTANT DURING IN-SERVICE PERIOD", filed on Nov. 26, 2021. The entirety of this Chinese patent application is hereby incorporated by reference herein and made a part of this specification.

TECHNICAL FIELD

The present invention relates to the technical field of hydrogel improved subgrades based on weather-resistant, especially to an adjustment method of moisture content and a dense state for a hydrogel improved subgrade based on weather-resistant during an in-service period.

BACKGROUND

The optimum moisture content (OMC) for a subgrade engineering construction is supposed to meets the specific design requirements. However, with the completion of the subgrade and put it into service for years, many factors like "pot cover effect", freezing and thawing cycle, rainfall infiltration, and underground water table changes cause the moisture content of subgrade may be much higher than the initial design requirements. It directly leads to the softening of the subgrade, reducing the dense degree and service strength of the subgrade. In this way, a large number of subgrade disease may generate, cataclysmic engineering accidents may occur, and the heavy/intermediate maintenance costs are high.

The existing subgrades cannot perform an automatic adjustment when the moisture content is too high or too low.

SUMMARY

To solve the disadvantage that the existing subgrades cannot perform an automatic adjustment when the moisture content is too high or too low, it is an object of the present invention to propose an adjustment method of moisture content and a dense state for a hydrogel improved subgrade based on weather-resistant during an in-service period.

To achieve the above purpose, the present invention adopts the following technical solutions:

The adjustment method of the moisture content and the dense state for the hydrogel improved subgrade based on the weather-resistant during the in-service period, including the following steps:

Step 1: carrying out a surface cleaning and compaction for a ground;

Step 2: preparing a raw material of the hydrogel improved subgrade, the raw material of the hydrogel improved subgrade includes (by weight percentage, Wt. %): hydrogel 0.3%-1% (ultrafine bentonite 20%-25%, sodium hydroxide solution 0.02%-0.08%, acrylic acid solution 0.2%-0.4%, an initiator 0.2%-0.4%, N, N' methylene-bis-acrylamide 0.2%-0.4%, 2-hydroxyethyl methacrylate 5%-10%), a surfactant 0.2%-0.5%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

Preferably, in the step 2, the raw material of the hydrogel improved subgrade includes (Wt. %): the hydrogel 0.4%-0.6% (the ultrafine bentonite 22%-24%, the sodium hydroxide solution 0.05%-0.06%, the acrylic acid solution 0.25%-0.35%, the initiator 0.3%-0.35%, the N, N' methylene-bis-acrylamide 0.25%-0.3%, the 2-hydroxyethyl methacrylate 7%-8%), the surfactant 0.3%-0.4%, and the rests are other fillers required by the construction.

Preferably, in the step 2, the raw material of the hydrogel improved subgrade includes (Wt. %): the hydrogel 0.5% (the ultrafine bentonite 23%, the sodium hydroxide solution 0.055%, the acrylic acid solution 0.3%, the initiator 0.32%, the N, N' methylene-bis-acrylamide 0.28%, the 2-hydroxyethyl methacrylate 7.5%), the surfactant 0.35%, and the rests are other fillers required by the construction.

Preferably, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 10-20 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 20-30 min to obtain a mixed solution;

Step 2.4: adding a certain amount of potassium persulfate and the 2-hydroxyethyl methacrylate to the mixed solution of the step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

Preferably, the initiator may be a mixture of any two or three of glycol diglycidyl ether, glycerol diglycidyl ether, polyethylene glycol diglycidyl ether, glycerol, propylene glycol, ethylene glycol, 1,4-butanediol, ethylene carbonate, and propylene carbonate.

Preferably, the surfactant may be a mixture of any two or three of sucrose fatty acid esters, glyceryl monostearate, sorbitan fatty acid esters, polyoxyethylene glycol fatty acid esters, and alkylphenol ethoxylates (APEO).

Preferably, stirring and mixing the modified water-absorbing resin, the initiator, the surfactant, the hydrogel, and the concrete by adding into a mixer for 50-60 min, at room temperature, and a stirring speed of 200-300 r/min.

Preferably, in the step 3, there is an interval of 2-3 days after the first-layer improved subgrade is paved, and the first-layer improved subgrade is covered during the interval.

Preferably, in the step 4, the plain soil subgrade is tamped after being paved, wherein a thickness of the plain soil subgrade is 4-15 times a thickness of the first-layer improved subgrade.

Preferably, in the step 5, there is an interval of 3-4 days after the second-layer improved subgrade is formed by paving the raw material of the hydrogel improved subgrade on the plain soil subgrade, and the second-layer improved subgrade is covered during the interval.

Compared with the prior art, the present invention has the advantages as follows:

According to the present invention, the prepared modified water-absorbing resin may expand slightly when encountering water, and will be interlocked with soil particles to form a compact and stable structure, which can not only reduce the internal communicating pores of the soil body of the subgrade, and improve the anti-permeability and anti-erosion performance of the soil body, but also reduce the capillary phenomenon; moreover, it can reduce the water pressure of the internal pores of the soil body and improve the effective stress.

According to the present invention, through the water release of the modified water-absorbing resin during drying, the moisture content of the soil body can be ensured to be in a smaller change range all the time, which can avoid the formation of cracks due to the drying shrinkage of the soil body of the subgrade, reduce the damage caused by the dry-wet cycle, and improve the bearing capacity of the main body of the subgrade and the stability of the side slope during the operation period.

According to the present invention, the moisture state inside the soil body of the subgrade may be intelligently regulated through the functions of absorbing water under the wetting condition and releasing water under the drying condition by the weather-resistant water-absorbing resin, the dense degree and strength of the soil body of the subgrade are ensured by filling the pore structure of the soil body of the subgrade by the micro-expansion and approximate hygroscopic water state of the hydrogel.

According to the present invention, by combining and mixed using the water absorption and release function of the modified resin and the characteristic of the gel state thereof, the paved hydrogel improved subgrade can absorb water and generate slight expansion when the moisture content in the subgrade is increased to a certain threshold value so that the moisture content of free water in the soil body of the subgrade is reduced, the internal dense degree of the soil body of the subgrade is improved through micro-expansion, and the subgrade engineering is always in a healthy state; in the same way, when the moisture content of the subgrade is low to a certain threshold value, the improved subgrade can release water, to ensure that the subgrade will not appear the cracking disease due to drying.

BRIEF DESCRIPTION OF THE DRAWINGS

FIG. 1 is a flow chart of an adjustment method of moisture content and a dense state for a hydrogel improved subgrade based on weather-resistant during an in-service period proposed by the present invention.

DETAILED DESCRIPTION

The technical solutions in the embodiments of the present invention will be clearly and completely described below in combination with the accompanying drawings in the embodiments of the present invention. Obviously, the described embodiments are only a part of the embodiments of the present invention, not all the embodiments.

Example 1

Referring to FIG. 1, an adjustment method of moisture content and a dense state for a hydrogel improved subgrade based on weather-resistant during an in-service period, including the following steps:

Step 1: carrying out a surface cleaning and compaction for a ground;

Step 2: preparing a raw material of the hydrogel improved subgrade, the raw material of the hydrogel improved subgrade includes (Wt. %): hydrogel 0.3% (ultra-fine bentonite 20%, sodium hydroxide solution 0.02%, acrylic acid solution 0.2%, initiator 0.2%, N, N' methylene-bis-acrylamide 0.2%, 2-hydroxyethyl methacrylate 5%), a surfactant 0.2%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

In the present example, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 10-20 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 20 min to obtain a mixed solution;

Step 2.4: adding a certain amount of potassium persulfate and the 2-hydroxyethyl methacrylate to the mixed solution of the step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

In the present example, the initiator is a mixture of glycol diglycidyl ether, glycerol diglycidyl ether, and polyethylene glycol diglycidyl ether.

In the present example, the surfactant is a mixture of sucrose fatty acid esters and glyceryl monostearate.

In the present example, stirring and mixing the modified water-absorbing resin, the initiator, the surfactant, the hydrogel, and the concrete by adding into a mixer for 50 min, at room temperature, and a stirring speed of 200 r/min.

In the present example, in the step 3, there is an interval of 2 days after the first-layer improved subgrade is paved, and the first-layer improved subgrade is covered during the interval.

In the present example, in the step 4, the plain soil subgrade is tamped after being paved, wherein a thickness of the plain soil subgrade is 4 times a thickness of the first-layer improved subgrade.

In the present example, in the step 5, there is an interval of 3 days after the second-layer improved subgrade is formed by paving the raw material of the hydrogel improved subgrade on the plain soil subgrade, and the second-layer improved subgrade is covered during the interval.

Example 2

Referring to FIG. 1, an adjustment method of moisture content and a dense state for a hydrogel improved subgrade based on weather-resistant during an in-service period, including the following steps:

Step 1: carrying out a surface cleaning and compaction for a ground;

Step 2: preparing a raw material of the hydrogel improved subgrade, the raw material of the hydrogel improved subgrade includes (Wt. %): hydrogel 0.4% (ultra-fine bentonite 21%, sodium hydroxide solution 0.03%, acrylic acid solution 0.22%, initiator 0.22%, N, N' methylene-bis-acrylamide 0.22%, 2-hydroxyethyl methacrylate 6%), a surfactant 0.3%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

In the present example, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 10-20 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 22 min to obtain a mixed solution;

Step 2.4: adding a certain amount of potassium persulfate and the 2-hydroxyethyl methacrylate to the mixed solution of step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

In the present example, the initiator is a mixture of polyethylene glycol diglycidyl ether, glycerol, and propylene glycol.

In the present example, the surfactant is a mixture of sorbitan fatty acid esters, polyoxyethylene glycol fatty acid esters, and APEO.

In the present example, stirring and mixing the modified water-absorbing resin, the initiator, the surfactant, the hydrogel, and the concrete by adding into a mixer for 52 min, at room temperature, and a stirring speed of 220 r/min.

In the present example, in the step 3, there is an interval of 2 days after the first-layer improved subgrade is paved, and the first-layer improved subgrade is covered during the interval.

In the present example, in the step 4, the plain soil subgrade is tamped after being paved, wherein a thickness of the plain soil subgrade is 6 times a thickness of the first-layer improved subgrade.

In the present example, in the step 5, there is an interval of 3 days after the second-layer improved subgrade is formed by paving the raw material of the hydrogel improved subgrade on the plain soil subgrade, and the second-layer improved subgrade is covered during the interval.

Example 3

Referring to FIG. 1, an adjustment method of moisture content and a dense state for a hydrogel improved subgrade based on weather-resistant during an in-service period, including the following steps:

Step 1: carrying out a surface cleaning and compaction for a ground;

Step 2: preparing a raw material of the hydrogel improved subgrade, the raw material of the hydrogel improved subgrade includes (Wt. %): hydrogel 0.5% (ultra-fine bentonite 23%, sodium hydroxide solution 0.04%, acrylic acid solution 0.3%, initiator 0.3%, N, N' methylene-bis-acrylamide 0.3%, 2-hydroxyethyl methacrylate 7%), a surfactant 0.23%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

In the present example, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 10-20 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 24 min to obtain a mixed solution;

Step 2.4: adding a certain amount of potassium persulfate and the 2-hydroxyethyl methacrylate to the mixed solution of step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

In the present example, the initiator is a mixture of glycol diglycidyl ether, ethylene carbonate, and propylene carbonate.

In the present example, the surfactant is a mixture of sucrose fatty acid esters, polyoxyethylene glycol fatty acid esters, and APEO.

In the present example, stirring and mixing the modified water-absorbing resin, the initiator, the surfactant, the hydrogel, and the concrete by adding into a mixer for 54 min, at room temperature, and a stirring speed of 240 r/min.

In the present example, in the step 3, there is an interval of 2.2 days after the first-layer improved subgrade is paved, and the first-layer improved subgrade is covered during the interval.

In the present example, in the step 4, the plain soil subgrade is tamped after being paved, wherein a thickness of the plain soil subgrade is 8 times a thickness of the first-layer improved subgrade.

In the present example, in the step 5, there is an interval of 3.2 days after the second-layer improved subgrade is formed by paving the raw material of the hydrogel improved subgrade on the plain soil subgrade, and the second-layer improved subgrade is covered during the interval.

Example 4

Referring to FIG. 1, an adjustment method of moisture content and a dense state for a hydrogel improved subgrade based on weather-resistant during an in-service period, including the following steps:

Step 1: carrying out a surface cleaning and compaction for a ground;

Step 2: preparing a raw material of the hydrogel improved subgrade, the raw material of the hydrogel improved subgrade includes (Wt. %): hydrogel 0.8% (ultra-fine bentonite 24%, sodium hydroxide solution 0.06%, acrylic acid solution 0.34%, initiator 0.34%, N, N' methylene-bis-acrylamide 0.34%, 2-hydroxyethyl methacrylate 8%), a surfactant 0.4%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

In the present example, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 11 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 28 min to obtain a mixed solution;

Step 2.4: adding a certain amount of potassium persulfate and the 2-hydroxyethyl methacrylate to the mixed solution of step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

In the present example, the initiator is a mixture of polyethylene glycol diglycidyl ether, 1,4-butanediol, and ethylene carbonate.

In the present example, the surfactant is a mixture of sucrose fatty acid esters, sorbitan fatty acid esters, and APEO.

In the present example, stirring and mixing the modified water-absorbing resin, the initiator, the surfactant, the hydrogel, and the concrete by adding into a mixer for 58 min, at room temperature, and a stirring speed of 260 r/min.

In the present example, in the step 3, there is an interval of 3 days after the first-layer improved subgrade is paved, and the first-layer improved subgrade is covered during the interval.

In the present example, in the step 4, the plain soil subgrade is tamped after being paved, wherein a thickness of the plain soil subgrade is 12 times a thickness of the first-layer improved subgrade.

In the present example, in the step 5, there is an interval of 3.5 days after the second-layer improved subgrade is formed by paving the raw material of the hydrogel improved subgrade on the plain soil subgrade, and the second-layer improved subgrade is covered during the interval.

Example 5

Referring to FIG. 1, an adjustment method of moisture content and a dense state for a hydrogel improved subgrade based on weather-resistant during an in-service period, including the following steps:

Step 1: carrying out a surface cleaning and compaction for a ground;

Step 2: preparing a raw material of the hydrogel improved subgrade, the raw material of the hydrogel improved subgrade includes (Wt. %): hydrogel 1% (ultra-fine bentonite 25%, sodium hydroxide solution 0.08%, acrylic acid solution 0.4%, initiator 0.4%, N, N' methylene-bis-acrylamide 0.4%, 2-hydroxyethyl methacrylate 10%), a surfactant 0.5%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade;

Step 5: paving another layer of the prepared raw material of the hydrogel improved subgrade on a surface of the plain soil subgrade to form a second-layer improved subgrade; and Step 6: paving a pavement structure on a surface of the second-layer improved subgrade.

In the present example, in the step 2, a preparation method of the raw material of the hydrogel improved subgrade includes the following steps:

Step 2.1: preparing a certain dose of an ultrafine bentonite aqueous solution, and stirring the ultrafine bentonite aqueous solution into a micro-paste dispersion state at a reinforced high-speed stir for 20 min, to obtain an ultrafine bentonite material;

Step 2.2: taking and titrating the sodium hydroxide solution into the acrylic acid solution to prepare an acrylic acid solution with a certain neutralization degree;

Step 2.3: in a four-mouth beaker equipped with a nitrogen protection device, a thermometer, an electric stirring device, and a titration funnel, adding a certain amount of the ultrafine bentonite material and the N, N' methylene-bis-acrylamide to the solution of the step 2.2 in sequence under the condition of nitrogen protection, stirring thoroughly and then carrying out an ultrasonic dispersion for 30 min to obtain a mixed solution;

Step 2.4: adding a certain amount of potassium persulfate and the 2-hydroxyethyl methacrylate to the mixed solution of step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the other fillers required by the construction to prepare and obtain the raw material of the hydrogel improved subgrade.

In the present example, the initiator is a mixture of polyethylene glycol diglycidyl ether, propylene glycol, and ethylene carbonate.

In the present example, the surfactant is a mixture of sucrose fatty acid esters, sorbitan fatty acid esters, and APEO.

In the present example, stirring and mixing the modified water-absorbing resin, the initiator, the surfactant, the hydrogel, and the concrete by adding into a mixer for 60 min, at room temperature, and a stirring speed of 300 r/min.

In the present example, in the step 3, there is an interval of 3 days after the first-layer improved subgrade is paved, and the first-layer improved subgrade is covered during the interval.

In the present example, in the step 4, the plain soil subgrade is tamped after being paved, wherein a thickness of the plain soil subgrade is 15 times a thickness of the first-layer improved subgrade.

In the present example, in the step 5, there is an interval of 4 days after the second-layer improved subgrade is formed by paving the raw material of the hydrogel improved subgrade on the plain soil subgrade, and the second-layer improved subgrade is covered during the interval.

Comparative Example 1

Referring to FIG. 1, an adjustment method of moisture content and a dense state for a hydrogel improved subgrade based on weather-resistant during an in-service period, including the following steps:

Step 1: compacting a ground;

Step 2: preparing a raw material of the hydrogel improved subgrade, the raw material of the hydrogel improved subgrade includes (Wt. %): hydrogel 0.3% (ultra-fine bentonite 20%, sodium hydroxide solution 0.02%, acrylic acid solution 0.2%, initiator 0.2%, N, N' methylene-bis-acrylamide 0.2%, 2-hydroxyethyl methacrylate 5%), a surfactant 0.2%, and rests are other fillers required by construction;

Step 3: paving a layer of the prepared raw material of the hydrogel improved subgrade on a surface of the ground to form a first-layer improved subgrade by mechanically leveling and compacting; and Step 4: paving and mechanically leveling and compacting a plain soil subgrade on a surface of the first-layer improved subgrade.

The rests are the same as Example 1.

Comparative Example 2

Referring to FIG. 1, an adjustment method of moisture content and a dense state for a hydrogel improved subgrade based on weather-resistant during an in-service period, including the following steps:

Step 1: compacting a ground;

Step 2: preparing a raw material of the hydrogel improved subgrade, the raw material of the hydrogel improved subgrade includes (Wt. %): hydrogel 0.4% (ultra-fine bentonite 21%, sodium hydroxide solution 0.03%, acrylic acid solution 0.22%, initiator 0.22%, N, N' methylene-bis-acrylamide 0.22%, 2-hydroxyethyl methacrylate 6%), a surfactant 0.3%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade; and Step 5: paving another layer of the prepared raw material of the hydrogel improved subgrade on a surface of the plain soil subgrade to form a second-layer improved subgrade.

The rests are the same as Example 2.

Comparative Example 3

Referring to FIG. 1, an adjustment method of moisture content and a dense state for a hydrogel improved subgrade based on weather-resistant during an in-service period, including the following steps:

Step 1: compacting a ground;

Step 2: preparing a raw material of the hydrogel improved subgrade, the raw material of the hydrogel improved subgrade includes (Wt. %): hydrogel 0.5% (ultra-fine bentonite 23%, sodium hydroxide solution 0.04%, acrylic acid solution 0.3%, initiator 0.3%, N, N' methylene-bis-acrylamide 0.3%, 2-hydroxyethyl methacrylate 7%), a surfactant 0.23%, and rests are other fillers required by construction;

Step 3: paving a layer of the prepared raw material of the hydrogel improved subgrade on a surface of the ground to form a first-layer improved subgrade by mechanically leveling and compacting;

Step 4: paving and mechanically leveling and compacting a plain soil subgrade on a surface of the first-layer improved subgrade; and Step 5: paving another layer of the prepared raw material of the hydrogel improved subgrade on a surface of the plain soil subgrade to form a second-layer improved subgrade.

The rests are the same as Example 3.

The above description is only a preferred implementation of the present invention, but the scope of protection of the present invention is not limited thereto, and any equivalent replacement or change made by those skilled in the art according to the technical solution and the inventive concept of the present invention within the technical scope disclosed by the present invention shall be covered by the scope of protection of the present invention.

What is claimed is:

1. A method of paving a roadway using hydrogel modified subgrade, comprising:

Step 1: cleaning a surface of a ground to be paved and compacted;

Step 2: preparing the hydrogel modified subgrade, wherein the hydrogel modified subgrade comprises (by weight percentage, Wt. %): weather-resistant hydrogel 0.3%-1%, surfactant 0.2%-0.5%, and filling materials required for subgrade construction, and the weather-resistant hydrogel comprises ultrafine bentonite 20%-25%, sodium hydroxide solution 0.02%-0.08%, acrylic acid solution 0.2%-0.4%, initiator 0.2%-0.4%, N, N' methylene-bis-acrylamide 0.2%-0.4%, 2-hydroxyethyl methacrylate 5%-10%;

wherein, a preparation method of the hydrogel modified subgrade, comprises:

Step 2.1: preparing an ultrafine bentonite aqueous solution, and stirring the ultrafine bentonite aqueous solution into a micro-paste dispersion state at a reinforced high-speed stir for 10-20 min, to obtain an ultrafine bentonite material;

Step 2.2: titrating the sodium hydroxide solution into the acrylic acid solution to prepare an acrylic acid solution with a certain neutralization degree;

Step 2.3: putting the acrylic acid solution obtained from step 2.2 in a four-mouth beaker, adding the ultrafine bentonite material and the N, N' methylene-bis-acrylamide to the acrylic acid solution in sequence under a condition of nitrogen protection, stirring thoroughly and then carrying out an ultrasonic dispersion for 20-30 min to obtain a mixed solution;

Step 2.4: adding potassium persulfate and the 2-hydroxyethyl methacrylate to the mixed solution of the step 2.3 and stirring thoroughly to obtain a solution, which is subjected to a rapid polymerization reaction under a certain constant-temperature water bath condition to obtain a gel mixture, and then drying, crushing and grinding the gel mixture to obtain a modified water-absorbing resin;

Step 2.5: preparing the initiator and the surfactant in sequence; and

Step 2.6: stirring and mixing the modified water-absorbing resin, the initiator, the surfactant, and the filling material required for subgrade construction to prepare and obtain the hydrogel modified subgrade;

Step 3: paving a layer of the hydrogel modified subgrade on the surface of the ground to be paved to form a first-layer hydrogel modified subgrade by mechanically leveling and compacting;

Step 4: paving and mechanically leveling and compacting a plain soil subgrade on a surface of the first-layer hydrogel modified subgrade;

Step 5: paving another layer of the hydrogel modified subgrade on a surface of the plain soil subgrade to form a second-layer hydrogel modified subgrade; and Step 6: paving a pavement structure on a surface of the second-layer hydrogel modified subgrade.

2. The method according to claim 1, wherein, in the step 2, the hydrogel modified subgrade comprises (Wt. %): the weather-resistant hydrogel 0.4%-0.6%, the surfactant 0.3%-0.4%, and the filling materials required for subgrade construction, wherein the weather-resistant hydrogel comprises the ultrafine bentonite 22%-24%, the sodium hydroxide solution 0.05%-0.06%, the acrylic acid solution 0.25%-0.35%, the initiator 0.3%-0.35%, the N, N' methylene-bis-acrylamide 0.25%-0.3%, the 2-hydroxyethyl methacrylate 7%-8%.

3. The method according to claim 1, wherein, in the step 2, the hydrogel modified subgrade comprises (Wt. %): the weather-resistant hydrogel 0.5%, the surfactant 0.35%, and the filling materials required for subgrade construction, wherein the weather-resistant hydrogel comprises the ultrafine bentonite 23%, the sodium hydroxide solution 0.055%, the acrylic acid solution 0.3%, the initiator 0.32%, the N, N' methylene-bis-acrylamide 0.28%, the 2-hydroxyethyl methacrylate 7.5%.

4. The adjustment according to claim 1, wherein the initiator is a mixture of any two or three of glycol diglycidyl ether, glycerol diglycidyl ether, polyethylene glycol diglycidyl ether, glycerol, propylene glycol, ethylene glycol, 1,4-butanediol, ethylene carbonate, and propylene carbonate.

5. The method according to claim 1, wherein the surfactant is a mixture of any two or three of sucrose fatty acid esters, glyceryl monostearate, sorbitan fatty acid esters, polyoxyethylene glycol fatty acid esters and alkylphenol ethoxylates.

6. The adjustment according to claim 1, wherein stirring and mixing the modified water-absorbing resin, the initiator, the surfactant, and the filling materials required for subgrade construction by adding into a mixer for 50-60 min, at room temperature, and a stirring speed of 200-300 r/min.

7. The method according to claim 1, wherein in the step 3, there is an interval of 2-3 days after the first-layer hydrogel modified subgrade being is paved, and the first-layer hydrogel modified subgrade is covered during the interval.

8. The method according to claim 1, wherein in the step 4, the mechanically leveling and compacting the plain soil subgrade after being paved, wherein a thickness of the plain soil subgrade is 4-15 times a thickness of the first-layer hydrogel modified subgrade.

9. The method according to claim 1, wherein in the step 5, there is an interval of 3-4 days after the second-layer hydrogel modified subgrade is formed by paving the hydrogel modified subgrade on the plain soil subgrade,; and the second-layer hydrogel modified subgrade is covered during the interval.

* * * * *